(12) United States Patent
Owens et al.

(10) Patent No.: US 10,002,394 B1
(45) Date of Patent: *Jun. 19, 2018

(54) ROADSIDE REPORTER SYSTEM

(71) Applicant: Allstate Insurance Company, Northbrook, IL (US)

(72) Inventors: Theresa A. Owens, Chicago, IL (US); Alinawaz Ismaili, Skokie, IL (US); Brennan Gee, Roanoke, VA (US); Francis Lowry, Clogher (GB)

(73) Assignee: Allstate Insurance Company, Northbrook, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/497,401

(22) Filed: Apr. 26, 2017

Related U.S. Application Data

(63) Continuation of application No. 14/523,429, filed on Oct. 24, 2014.

(51) Int. Cl.
*G06Q 40/08* (2012.01)
*H04W 64/00* (2009.01)
(Continued)

(52) U.S. Cl.
CPC ......... *G06Q 40/08* (2013.01); *G06Q 30/0226* (2013.01); *G07C 5/008* (2013.01); *H04W 64/00* (2013.01)

(58) Field of Classification Search
CPC .... B60Q 9/00; B60R 1/04; B60R 1/12; B60R 2001/1215; B60R 2001/1253;
(Continued)

(56) References Cited

U.S. PATENT DOCUMENTS 7,756,633 B2    7/2010   Huang et al.
8,228,380 B2    7/2012   Hardee et al.
(Continued)

FOREIGN PATENT DOCUMENTS

WO    2001091353 A2    11/2001
WO    2002003163 A2    1/2002
(Continued)

OTHER PUBLICATIONS

Frequently Asked Questions, Baton Rouge Police Department, © 1997—City of Baton Rouge/Parish of East Baton Rouge, http:\\www.brgov.com/dept/brpd/faq.htm, dated May 12, 2014, pp. 1-9.
(Continued)

*Primary Examiner* — Laura Nguyen
(74) *Attorney, Agent, or Firm* — Banner & Witcoff Ltd.

(57) ABSTRACT

Systems and methods are provided for processing notifications regarding issues with nearby vehicles. A roadside reporter receives notifications from individuals or computing devices reporting problems or violations associated with nearby vehicles, and the notification for uniqueness and authenticity. Upon determining that the notification is unique and authentic, the roadside reporter system notifies the driver of the nearby vehicle and other relevant parties about the problem or violation. The roadside reporter may issue rewards to the reporting user. The roadside reporter system further allows the driver of the nearby vehicle to respond to the notification, and subsequently provides the driver with incentives to address the problem or violation.

20 Claims, 7 Drawing Sheets

(51) Int. Cl.
*G06Q 30/02* (2012.01)
*G07C 5/00* (2006.01)

(58) Field of Classification Search
CPC ...... H04N 7/185; G08G 1/017; G08G 1/0175; G08G 1/0962–1/096791
See application file for complete search history.

(56) References Cited

U.S. PATENT DOCUMENTS

| | | | |
|---|---|---|---|
| 8,547,250 | B1 | 10/2013 | Al-Mutawa |
| 2006/0059229 | A1* | 3/2006 | Bain ...................... G01C 21/26 709/205 |
| 2007/0126601 | A1 | 6/2007 | Park |
| 2009/0024273 | A1 | 1/2009 | Follmer et al. |
| 2009/0051510 | A1 | 2/2009 | Follmer et al. |
| 2009/0210257 | A1 | 8/2009 | Chalfant et al. |
| 2009/0233631 | A1 | 9/2009 | Butler, Sr. et al. |
| 2010/0030582 | A1 | 2/2010 | Rippel et al. |
| 2011/0320492 | A1 | 12/2011 | Inghelbrecht |
| 2012/0066088 | A1* | 3/2012 | Murset ................... G06Q 10/06 705/26.8 |
| 2013/0179198 | A1 | 7/2013 | Bowne et al. |
| 2013/0278440 | A1* | 10/2013 | Rubin ...................... G08G 9/02 340/903 |
| 2013/0316311 | A1* | 11/2013 | England ............... G09B 19/167 434/65 |
| 2013/0337909 | A1 | 12/2013 | Pattison et al. |
| 2014/0046701 | A1 | 2/2014 | Steinberg et al. |
| 2014/0222323 | A1* | 8/2014 | Purushothaman . G06Q 30/0201 701/117 |
| 2014/0240349 | A1* | 8/2014 | Tuukkanen ........... G06F 3/0484 345/633 |
| 2015/0177964 | A1* | 6/2015 | Spirer ................... G06F 3/0484 715/732 |
| 2015/0302744 | A1 | 10/2015 | Lin |
| 2016/0039426 | A1* | 2/2016 | Ricci ..................... H04W 48/04 701/1 |
| 2016/0127852 | A1* | 5/2016 | Bostick ................. G08G 1/166 701/117 |
| 2016/0140776 | A1* | 5/2016 | Ricci ......................... G06F 9/54 701/31.4 |

FOREIGN PATENT DOCUMENTS

| | | |
|---|---|---|
| WO | 2008032305 A2 | 3/2008 |
| WO | 2008045801 A2 | 4/2008 |
| WO | 2013072926 A2 | 5/2013 |
| WO | 2013074867 A2 | 5/2013 |
| WO | 2013093933 A1 | 6/2013 |

OTHER PUBLICATIONS

Driver & Vehicle Standards Agency, Guide to maintaining roadwirthiness, Commercial goods and passenger carrying vehicles (Revised 2014), pp. 1-54.
NRS: Chaptger 487—Repair, Removal and Disposal of Vehicles, http://www.leg.state.nv.us/NRS/NRFS-487.html, dated May 12, 2014, pp. 1-37.
The City of Memphis, Code Enforcement, © 2014 City of Memphis, http://www.memphistn.gov/Government/PublicWorks/CodeEnforcement.aspx, dated May 12, 2014, pp. 1-2.
IEEE Xplore, A dynamic real-time fleet management system for incident handling in city logistics, © 2014 IEEE, http://ieeexplore.ieee.org/xpl/articleDetails.jsp?reload=true&arnumber=1543877, dated May 12, 2014, pp. 1-2.
The Canadian Bar Association, Making a Vehicle Damage Claim, http://www.cbabc.org/For-the-Public/Dial-A-Law/Scripts/Automobiles/186, dated May 12, 2014, pp. 1-4.
State of New Jersey, Department of Banking & Insurance, What you should know about . . . Filing an Uninsured/Underinsured Motorist Property Damage Claim, © 2008 State of New Jersey, http://www.state.nju/us/dobi/ins_ombudsman/wysk3.htm, dated May 12, 2014, pp. 1-5.
Hit-and-Run Victim's Legal Rights Handbook, © 2011 Bisnar/Chase, http://www.hitandrunreward.com/hit-run-victims-rights-handbook.html, dated May 12, 2014, pp. 1-2.
Report a bad driver - *555 and Roadwatch, http://www.police.govt.nz/adice/dirving-and-road-safety/report-bad-driver, Oct. 29, 2014, 1 page.
California Environmental Protection Agency, Smoking Vehicle Complaint Program, http://www.arb.ca.gov/enf/complaints/smoke.htm, dated May 12, 2014, pp. 1-2.
Let's Clear the Air!, www.valleyair.org, pp. 1-2.
Smooth Operator, How to Avoid Agressive Drivers, http://www.smoothoperatorprogram.com/aggressive_reporting.html#trucks, dated May 12, 2014, pp. 1-2.
Victoria Police, Speed camera, traffic, crime and other infringements, http://www.polic.vic.gov.au/content.asp?Document_ID=10366, Release Date Jul. 9, 2008, updated Dec. 16, 2013, pp. 1-2.
Aug. 17, 2016—(US) Non-Final Office Action—U.S. Appl. No. 14/523,429.
Feb. 7, 2017—(US) Notice of Allowance—U.S. Appl. No. 14/523,429.

* cited by examiner

ROADSIDE REPORTER SYSTEM

RELATED APPLICATION

The present application is a continuation patent application of U.S. patent application Ser. No. 14/523,429, filed Oct. 24, 2014. The entire disclosure of the aforementioned priority application is hereby incorporated by reference.

BACKGROUND

Insurance companies value the safety of drivers and the general public. Accordingly, promoting regular maintenance of automobiles and promptly addressing issues is a matter of good policy. Although techniques exist for driver-to-driver communication, they do not provide a mechanism whereby insurance companies may verify whether the problem or violation has been addressed. Further, these techniques do not provide the driver of an impaired vehicle with incentives to address the reported issues.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides an apparatus of a roadside reporter system. The apparatus may include at least one processor. The apparatus may be configured to, in operation, receive, at a first time, a notification of an issue (e.g., status) associated with a first vehicle. The notification may originate from a second vehicle within an observable distance of the first vehicle. The apparatus may determine the uniqueness of the notification, and output, at a second time, the notification to the first vehicle. In some examples, there may be no more than 30 seconds between the first time and the second time. Further, the apparatus may receive an acknowledgement of the issue originating from the first vehicle. The apparatus may determine the reliability of the notification, and provide rewards to the second vehicle for providing the notification, based, at least in part, on the uniqueness and reliability of the notification.

Where the issue is a problem associated with the first vehicle, the apparatus may receive a request originating from the first vehicle to address the problem independently. In response, the apparatus may provide the first vehicle with at least one tutorial to assist in addressing the problem independently. Further, the apparatus may receive and verify a confirmation that the problem has been address by the first vehicle, and in response, the apparatus may provide at least one reward to the first vehicle for addressing the problem. Alternatively, the apparatus may receive a request from the first vehicle to address the problem at an automobile repair shop. In response, the apparatus may provide the first vehicle with a list including at least one automobile repair shop. Further, the apparatus may receive and verify a confirmation that the problem has been addressed, and in response, the apparatus may provide at least one reward to the first vehicle for addressing the problem.

Where the issue is a violation associated with the first vehicle, the apparatus may provide the first vehicle with at least one tutorial to educate the first vehicle about the violation and public safety. Further, the apparatus may receive and verify and confirmation that the at least one tutorial has been completed, and in response, provide at least one reward to the first vehicle for addressing the violation. Alternatively, the apparatus may receive a contestation of the notification from the first vehicle, where the contestation may include a confirmation that the notification is invalid. In response, the apparatus may provide at least one reward to the first vehicle for contesting the notification.

A second aspect described herein provides an apparatus of a roadside reporter system, where the apparatus is at a first vehicle. The apparatus may include a location positioning component capable of determining a first location of the first vehicle, an antenna configured to communicate via wireless communication, and at least one processor. The apparatus may be configured to, in operation, receive, at the first vehicle via the antenna, a notification of an issue associated with the first vehicle. The notification may originate from a second vehicle having a second location within a predetermined radius of the first location. Further, the apparatus may transmit, via the antenna, an acknowledgement of the issue.

Where the issue is a problem associated with the first vehicle, the apparatus may transmit, via the antenna, a request to address the problem independently. In response, the apparatus may receive, via the antenna, at least one tutorial to assist in addressing the problem independently. Further, the apparatus may transmit, via the antenna, a confirmation that the problem has been addressed, and in response, receive, via the antenna, at least one reward for addressing the problem. Alternatively, the apparatus may transmit, via the antenna, a request to address the problem at an automobile repair shop. In response, the apparatus may receive, via the antenna, a list including the at least one automobile repair shop. Further, the apparatus may transmit, via the antenna, a confirmation that the problem has been addressed, and in response, receive, via the antenna, at least one reward for addressing the problem.

A third aspect described herein provides a computer-implemented method of processing roadside notifications. A computing system may receive a notification of an issue associated with a first vehicle, where the notification may originate from a second vehicle within an observable distance of the first vehicle. The computing system may determine the uniqueness and reliability of the notification, and output the notification to the first vehicle. Further, the computing device may receive an acknowledgement of the issue, where the acknowledgement may originate from the first vehicle.

Where the issue is a problem associated with the first vehicle, the computing device may receive a request to address the problem independently, where the request may originate from the first vehicle. In response, the computing device may provide the first vehicle with at least one tutorial to assist in addressing the problem independently. Further, the computing device may receive and verify a confirmation that the problem has been addressed, and in response, the computing device may provide at least one reward to the first vehicle for addressing the problem.

Alternatively, the computing device may receive a request to address the problem at an automobile repair shop, where the request may originate from the first vehicle. In response, the computing device may provide the first vehicle with a list including at least one automobile repair shop. Further, the computing device may receive and verify a confirmation that the problem has been addressed, and in response, the computing device may provide at least one reward to the first vehicle for addressing the problem.

The details of these and other aspects of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Aspects of the present disclosure are directed toward a roadside reporter system. The roadside reporter may receive notifications from users reporting issues with nearby vehicles. The roadside reporter system may evaluate the notification for uniqueness and reliability. Upon determining that the notification is unique and reliable, the roadside reporter system may provide a reward to the reporting user, and may notify the driver of the nearby vehicle and other relevant parties about the issue. The roadside reporter system further allows the driver of the nearby vehicle to respond to the notification of the issue, and subsequently provides the driver with incentives to address the issue in a timely fashion.

As used in this description, a customer of the roadside reporter system ("customer") refers to a user of the system, a driver of a nearby vehicle, an insurance company, or other related agency (e.g., a law enforcement agency, a fleet owner, etc.). As used in this description, a user of the roadside reporter system ("user") refers to a pedestrian, a citizen, a driver, or a system capable of making observations pertaining to nearby vehicles (e.g., visible problems, violations, behavioral patterns, etc.). Some examples of issues that may be observed and sent as notifications include, but are not limited to, an observed open fuel cap, observed low tire pressure, observed flat tire, other observed mechanical failure of the vehicle (e.g., dragging muffler beneath a car), an open trunk, frequent lane changes and/or speeding through traffic, an observed item (e.g., coffee cup) inadvertently left on the roof of a car, or other observations. The user may be a current or potential customer of an insurance company. As used in this description, a driver of a nearby vehicle ("driver") refers to a driver or owner of a vehicle within visible distance of a user. The driver may be a current or potential customer of an insurance company.

Further, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof, as well as additional items and equivalents thereof. Moreover, aspects of the disclosure may be implemented in non-transitory computer-readable media having instructions stored thereon that, when executed by a processor, cause the processor to perform various steps described in further detail below. As used in this description, non-transitory computer-readable media refers to all computer-readable media with the sole exception being a transitory propagating signal.

Figure 1A:
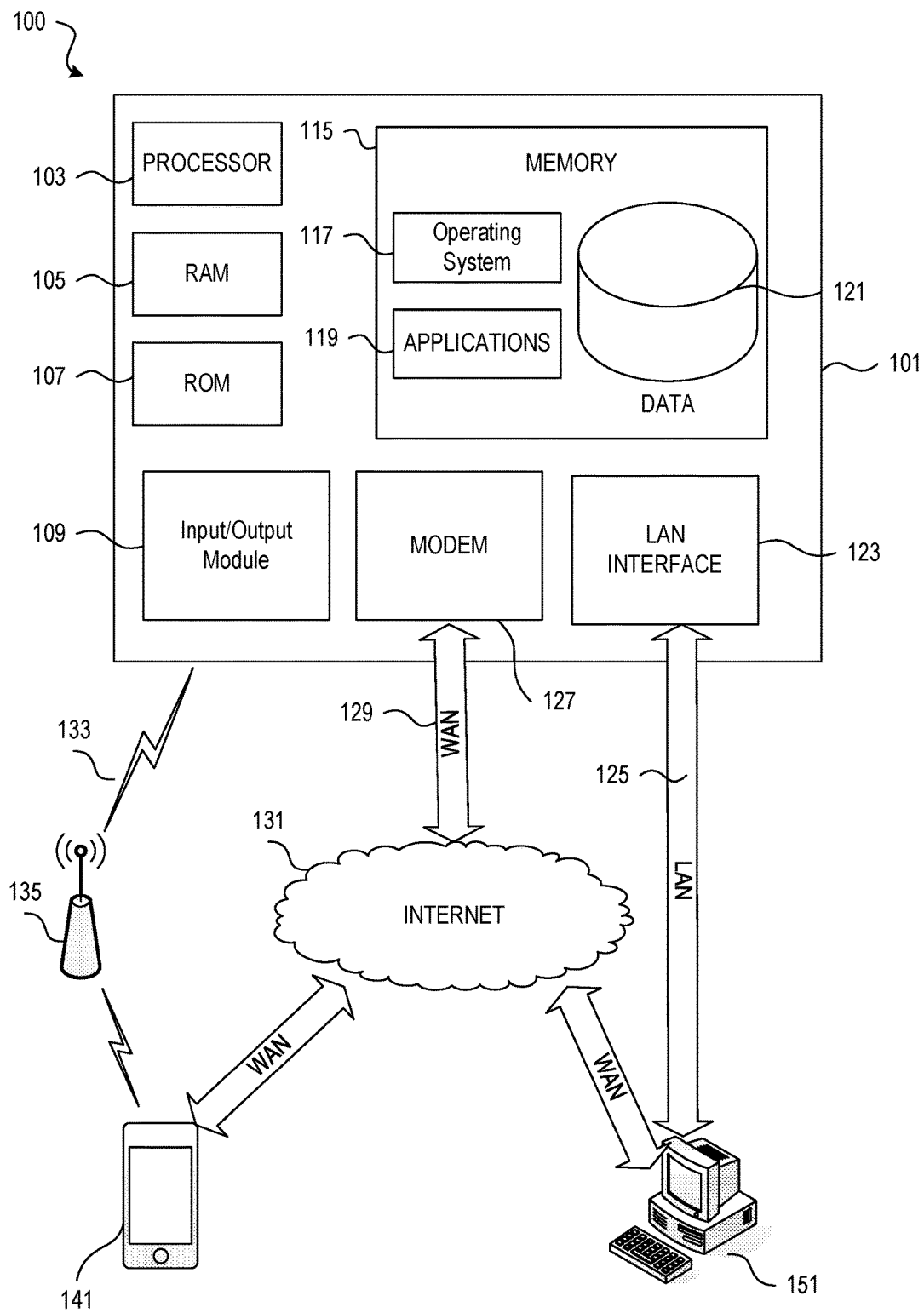
FIG. 1a illustrates a network environment and computing systems that may be used to implement aspects of the disclosure.

FIG. 1a illustrates a block diagram of a computing device (or system) 101 in communication system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a roadside reporter system, configured as described herein for receiving and processing notifications from users reporting issues with nearby vehicles.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the roadside reporter system 101 to execute a series of computer-readable instructions to receive notifications from users reporting issues with nearby vehicles, evaluate the notifications for uniqueness and reliability, issue rewards to users, notify drivers of the nearby vehicles and other relevant parties about issues, allow drivers to respond to notifications, and issue rewards to drivers.

The roadside reporter system 101 may operate in a networked environment 100 supporting connections to one or more remote computers, such as terminals 141 and 151. The terminals 141 and 151 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the roadside reporter system 101. The network connections depicted in FIG. 1a include a local area network (LAN) 125 and a wide area network (WAN) 129, and a wireless telecommunications network 133, but may also include other networks. When used in a LAN networking environment, the roadside reporter system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein may be configured to communicate using any of these network protocols or technologies.

Additionally, one or more application programs 119 used by the roadside reporter system 101 may include computer executable instructions (e.g., notification queue management programs, notification evaluation programs, notification communication programs, notification response programs, rewards analysis programs, etc.) for receiving notifications from users reporting issues with nearby vehicles, evaluating the notifications for uniqueness and reliability, issuing rewards to users, notifying drivers of nearby vehicles and other relevant parties about issues, allowing drivers to respond to notifications, issuing rewards to drivers, and performing other related functions as described herein.

Figure 1B:
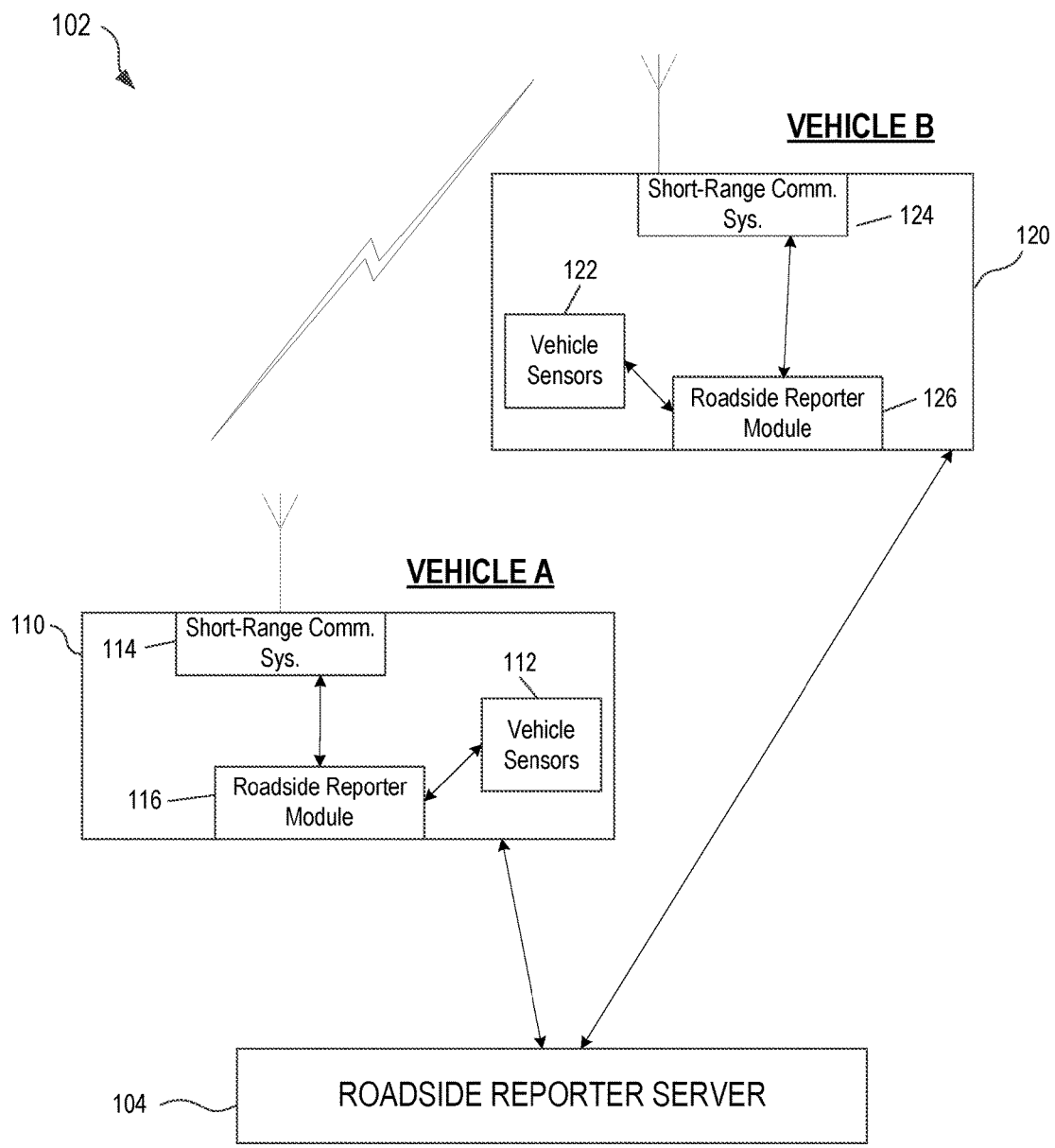
FIG. 1b is a block diagram illustrating various components and devices of a roadside reporting system, according to one or more aspects of the disclosure.

FIG. 1b is a diagram of an illustrative roadside reporter system 102 including two vehicles 110 and 120, a roadside reporter server 104, and additional related components. Each component shown in FIG. 2 may be implemented in hardware, software, or a combination of the two. Additionally, each component of the roadside reporter system 102 may include a computing device (or system) having some or all of the structural components described above for computing device 101.

Vehicles 110 and 120 in the roadside reporter system 200 may be, for example, automobiles, motorcycles, scooters, buses, recreational vehicles, boats, or other vehicles. The vehicles 110 and 120 each include vehicle operation sensors 112 and 122 capable of detecting and recording various conditions at the vehicle and operational parameters of the vehicle. For example, a Global Positioning System (GPS), locational sensors positioned inside the vehicles 110 and 120, and/or locational sensors or devices external to the vehicles 110 and 120 may be used to detect vehicle position/location data.

The roadside reporter server 104, described in further detail below, may allow users to notify a driver of a nearby vehicle and other related agencies of a perceived problem or violation with the nearby vehicle. Users may report the perceived problem or violation using the roadside reporter modules 116 and 126 of vehicles 110 and 120. Based on the information contained in the user's report of the problem or violation, the roadside reporter modules 116 and 126 may create a notification. Roadside reporter modules 116 and 126 may be implemented in hardware and/or software, and may be configured to receive data from vehicle operation sensors 112 and 122, short-range communication systems 114 and 124, I/O devices, and/or other external sources. In some examples, the roadside reporter modules 116 and 126 may be in signal communication with the roadside reporter server 104 via a network. In such examples, users may submit notifications to nearby vehicles and other related agencies through the roadside reporter server 104 via the roadside reporter modules 116 and 126. For instance, a user may submit a notification from vehicle 110 via roadside reporter module 116 to be received at vehicle 120 via roadside reporter module 126. In other words, the notification may originate from vehicle 110 (e.g., from an electronic device inside, coupled to, or integrated with the vehicle 110) and some or all of the information in the notification may be communicated, either directly (e.g., vehicle-to-vehicle communication) or indirectly (e.g., from the vehicle to a remote server back to the vehicle), to the appropriate module at vehicle 120. The network between the roadside reporter modules 116 and 126 and the roadside reporter server 104 may include one or more of a wired network (e.g., the Internet), a wireless network (e.g., a cellular network), or a combination of wired and wireless networks.

In some examples, a user may submit notifications through computing devices 101. The roadside reporter modules 116 and 126 may provide an interface to a computing device 101, which may be, for example, a desktop computer, a laptop computer, a tablet computer, a palmtop computer, a mobile computing device, a smartphone, an onboard computing platform included in a vehicle, or other type of computing device configured for network communications. The interface may be, for example, a web browser, desktop application, mobile application, or the like that resides at the computing device 101. In some examples, the computing device 101 (e.g., a mobile phone) may be equipped with GPS functionality which may be used to determine a vehicle's location without needing to communicate with the vehicle operation sensors 112 and 122, or any other vehicle system. The computing device 101 (e.g., a mobile phone) may be equipped with an accelerometer, barometer, digital compass, altimeter, and/or other sensors or measurement components to assist in collecting information about the vehicle.

Additionally or alternatively, the roadside reporter modules 116 and 126 in vehicles 110 and 120 may communicate with each other through short-range communication systems 114 and 124. Short-range communication systems 114 and 124 are vehicle-based data transmission systems configured to transmit data to other nearby vehicles, and to receive data from other nearby vehicles. In some examples, communication systems 114 and 124 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems 114 and 124 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 114 and 124 may be sent via DSRC, Bluetooth, satellite, GSM infrared, IEEE 802.11, WiMAX, RFID, and/or any suitable wireless communication media, standards, and protocols. In certain systems, short-range communication systems 114 and 124 may include specialized hardware installed in vehicles 110 and 120 (e.g., transceivers, antennas, etc.), while in other examples the communication systems 114 and 124 may be implemented using existing vehicle hardware components (e.g., radio and satellite equipment, navigation computers) or may be implemented by software running in the computing devices 101 of the roadside reporter modules 116 and 126 within the vehicles 110 and 120.

The range of V2V communications between vehicle communication systems 114 and 124 may depend on the wireless communication standards and protocols used, the transmission/reception hardware (e.g., transceivers, power sources, antennas), and other factors. Short-range V2V communications may range from just a few feet to many miles. V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 110 to any other vehicle, or other infrastructure device capable of receiving the communication, within the range of the vehicle's transmission capabilities. For example, a vehicle 110 may periodically broadcast (e.g., every 0.1 second, every 0.5 seconds, every second, every 5 seconds, etc.) certain vehicle operation data via its short-range communication system 114, regardless of whether or not any other vehicles or reception devices are in range. In other examples, a vehicle communication system 114 may first detect nearby vehicles and receiving devices, and may initialize communication with each by performing a handshaking transaction before beginning to transmit its vehicle operation data to the other vehicles and/or devices.

Where the roadside reporter modules 116 and 126 communicate through the short-range communicate systems 114 and 124, users may submit notifications to nearby vehicles and other related agencies directly through the roadside reporter modules 116 and 126. For example, a user may submit a notification from vehicle 110 via roadside reporter module 116 to be directly received at vehicle 120 via roadside reporter module 126, which may eliminate the need for the roadside reporter server 104. In such examples, the functionality of the roadside reporter server 104 would be included within the roadside reporter modules 116 and 126.

In some examples, the roadside reporting system 104 may evaluate the notification prior to communicating the notification to the driver of a nearby vehicle, and other relevant parties (e.g., insurance companies, traffic enforcement agencies, law enforcement agencies, fleet owners, etc.). Where the roadside reporter modules 116 and 126 communicate through the roadside reporter server 104, the roadside reporter server 104 may perform the evaluation. Alternatively, where the roadside reporter modules 116 and 126 communicate directly, the roadside reporter modules 116 and 126 may perform the evaluation. Following the evaluation, the notification is communicated to a nearby vehicle, where the driver of a nearby vehicle and the other relevant parties may receive the notification through an interface of the roadside reporter modules 116 and 126, e.g., a web browser, desktop application, mobile application, or the like that resides at the computing device 101.

The steps following the receipt of the notification by the driver of a nearby vehicle will either by performed at the roadside reporter server 104 or at the roadside reporter modules 116 and 126 of the vehicles 110 and 120. In the example implementation where the roadside reporter modules 116 and 126 communicate through the roadside reporter server 104, the roadside reporter server 104 may perform these steps. Accordingly, upon receiving the roadside notification record, the driver of a nearby vehicle may communicate with the roadside reporting server 104 to indicate acknowledgement or contestation to the problem or violation reported by the roadside notification record. Alternatively, where the roadside reporter modules 116 and 126 communicate directly, the roadside reporter modules 116 and 126 may perform these steps.

Figure 2:
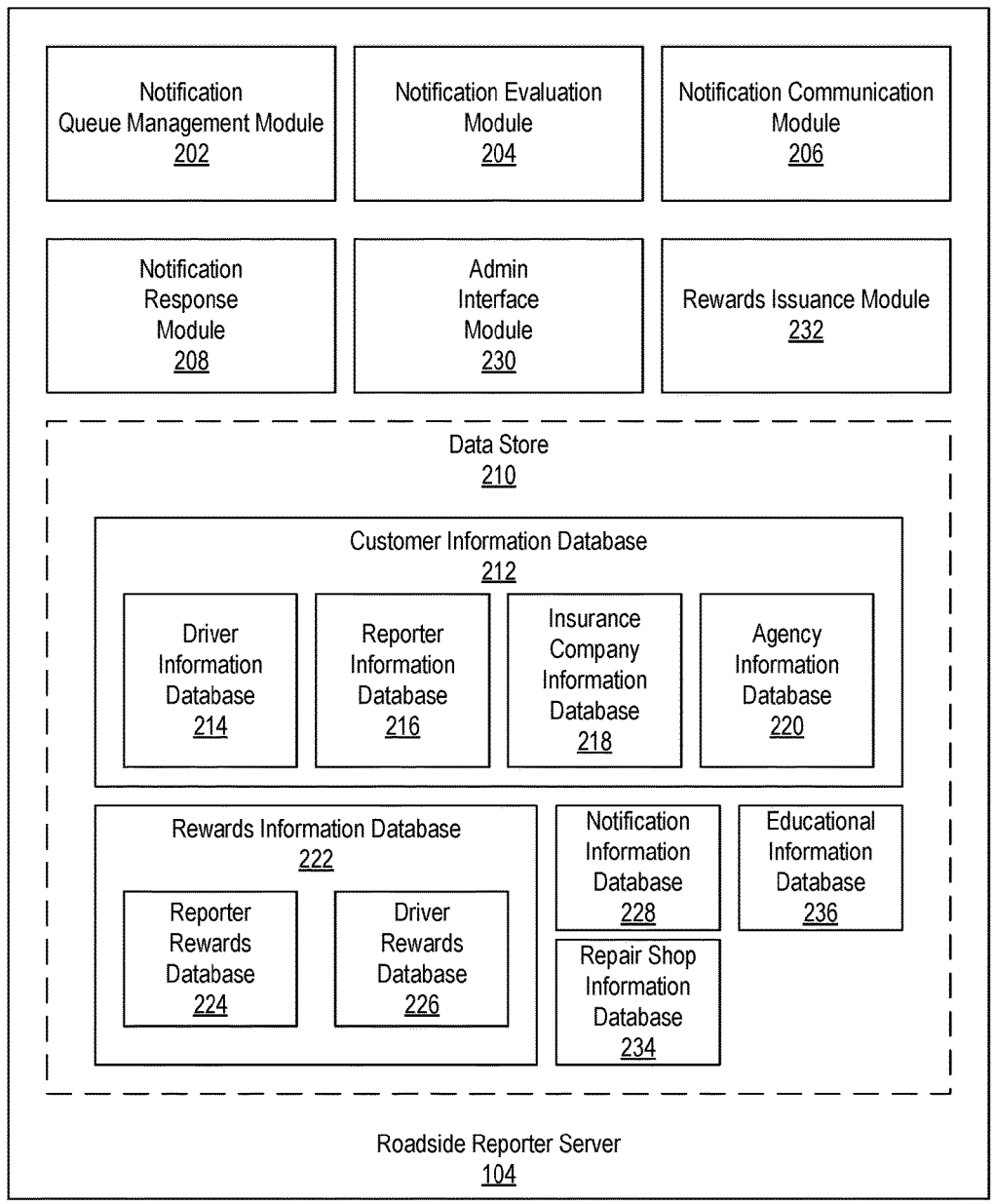
FIG. 2 is a block diagram of an example of an implementation of a roadside reporter server.

In FIG. 2, an example implementation of a roadside reporter server 104 of FIG. 1b is shown. The roadside reporter server 104 may include various components, modules, and sub-systems that facilitate various tasks, including receiving reports of problems or violations from users, creating notifications based on the reports, evaluating notifications for uniqueness and authenticity, informing drivers of vehicles and other related agencies of the problem or violation, and issuing rewards to reporting users and drivers. It will be appreciated that the roadside reporter server 104 illustrated in FIG. 2 is shown by way of example and that other implementations of roadside reporter systems 104 may include additional or alternative components, modules, sub-systems, and so forth. It will also be appreciated that where the vehicles 110 and 120 are in direct communication via short-range communication systems 114 and 124, the roadside reporter modules 116 and 126 may contain all of the hardware/software components included in the roadside reporter server 104.

The roadside reporter server 104, in this example, includes a notification queue management module 202, a notification evaluation module 204, a notification communication module 206, a notification response module 208, an admin interface module 230, a rewards issuance module 232, and a data store 210.

The data store 210 may store information related to customers, rewards, and notifications. The data store may thus include a customer information database 212, a rewards information database 222, a notification information database 228, a repair shop information database 234, and an educational information database 236. The roadside reporter server 104 may utilize this information in evaluating notifications, communicating with drivers of vehicles and other related agencies, and issuing rewards.

The customer information database 212 may include a driver information database 214, a reporter information database 216, an insurance company information database 218, and an agency information database 220. The driver information database 214 may store information associated with drivers of vehicles, e.g., name of driver, contact information, vehicle identification, and system preferences. The reporter information database 216 may store information associated with users of the roadside reporter system, e.g., name of reporter, and contact information. The insurance company information database 218 may store information associated with insurance companies, e.g., name of insurance company, contact information, and system preferences. Additionally, the insurance company information database 218 may maintain, e.g., through a database relationship, an association between an insurance company and one or more drivers in the driver information database 214. For example, a driver may be considered to be associated with an insurance company when the driver holds an insurance policy with the insurance company. Further, the insurance company information database 218 may maintain, e.g., through a database relationship, an association between an insurance company and one or more users in the reporter information database 216. For example, a user may be considered to be associated with an insurance company when the user holds an insurance policy with the insurance company. It will be appreciated by those skilled in the art that other circumstances may also result in an association between drivers, users, and insurance companies.

The agency information database 220 may store information associated with non-insurance agencies (e.g., law enforcement, fleet owners, etc.), e.g., name of agency, and contact information. Additionally, the agency information database 220 may maintain, e.g., through a database relationship, an association between an insurance company and one or more drivers in the driver information database 214. For example, a driver may be considered to be associated with an insurance company when the driver holds an insurance policy with the insurance company. It will be appreciated by those skilled in the art that other circumstances may also result in an associated between drivers, users, and agencies.

The rewards information database 222 may store information associated with rewards earned by reporters and drivers. The rewards information database may thus include a reporter rewards database 224, which may store information associated with rewards earned by reporters, and a driver rewards information database 226, which may store information associated with rewards earned by drivers. In some examples, the rewards may be issued by the roadside reported system 104 as points, where each reward corresponds to one or more points. Other examples for rewards will be appreciated by those skilled in the art. Additionally, the reporter rewards database 224 may maintain, e.g., through a database relationship, an association between a reward and a reporter in the reporter information database 216. Similarly, the driver rewards information database 226 may maintain, e.g., through a database relationship, an association between a reward and a driver in the driver information database 214. The roadside reporter server 104 may update this information upon issuing rewards to reporters and drivers of vehicles.

Additionally, the reporter information database 216 or driver information database 214 may maintain a rewards status or tier (e.g., Silver, Gold, Platinum, etc.), where each tier corresponds to the reporter or driver having earned a threshold number points. For example, if a reporter earns more rewards than the Silver threshold (e.g., 100 points), the roadside reporter server 104 may update the reporter information database 216 to indicate that the reporter has attained Silver status. Subsequently, if the reporter earns more rewards than the Gold threshold (e.g., 500 points), the roadside reporter 104 may update the reporter information database 216 to indicate that the reporter has attained Gold status. It will be appreciated by those skilled in the art that these rewards statuses and tiers are provided by way of example, and that other implementations of rewards statuses and tiers may include additional or alternative representations.

The notification information database 228 may store information associated with notifications received by the roadside reporter server 104, e.g., date of submission, location of submission, user identification, vehicle identification, and so forth. Additionally, the notification information database 228 may maintain, e.g., through a database relationship, an association between a notification and a driver in the driver information database 214. For example, a driver may be considered to be associated with a notification when the notification reports a problem or violation concerning the driver's vehicle. Further, the notification information database 228 may maintain, e.g., through a database relationship, an association between a notification and a user in the reporter information database 216. For example, a user may be considered to be associated with a notification when the notification is submitted by the user. It will be appreciated by those skilled in the art that other circumstances may also result in an associated between drivers, users, and notifications.

The repair shop information database 234 may store information associated with automobile repair shops, e.g., name, location, contact information, services offered, cost of services offered, and so forth. Additionally, the repair shop information database 234 may also store whether an auto shop is registered with the roadside reporter server 104. A registered auto shop may be entitled to a lesser burden when submitting confirmations on behalf of drivers associated with the roadside reporter server 104. The roadside reporter server 104 may establish a set of requirements or qualifications for an auto shop to become registered (e.g., date of establishment, regular quality checks, etc.). For example, the roadside reporter server 104 may require that an auto shop be in operation for five years, and conduct monthly quality checks by a mechanic licensed in the state of operation, in order to be registered.

The educational information database 236 may store information associated with known violations or problems. This information is used to educate drivers on the particular violations or problems reported against their vehicle. The education information may be stored in various formats, including, but not limited to, text, graphical, audio, video, and any combination thereof.

The admin interface module 230 may be configured to, in operation, allow drivers, reporters, insurance companies, and other agencies to control the operation of the roadside reporter server 104. The admin interface module 230 may include one or more user interfaces, through which drivers, reporters, insurance companies, and other agencies may configure the roadside reporter server 104. For example, the admin interface module 230 may include a user interface to allow drivers, reporters, insurance companies, and other agencies to update contact information. The admin interface module 230 may also include a user interface to allow drivers to update vehicle information. Additionally, the admin interface module 230 may include a user interface to set or update notification preferences. For example, the admin interface module 230 may allow drivers, insurance companies, and other agencies to configure the frequency (e.g., all, daily, weekly, quarterly, yearly) or type (e.g., all, traffic violations only, visible problems only) of notifications that may be received, and to configure at least one method (e.g. a preferred method) of receiving notifications (e.g., text, voice, graphical, other). The admin interface module 230 may also allow drivers, insurance companies, and other agencies to manage system configurations based on a notification's level of severity. For example, a driver may manage one set of notification preferences for severe risk notifications, but may manage a different set of notification preferences for low risk notifications. The admin interface module 230 may store these preferences in the driver information database 214 for drivers, in the insurance company information database 218 for insurance companies, and in the agency information database 220 for other agencies.

Example implementations of the notification queue management module 202, the notification evaluation module 204, the notification communication module 206, the notification response module 208, and the rewards issuance module 232 will be described in further detail below. Further, as noted above, these modules are described by way of example only and other implementations of a roadside reporter server 104 may include additional or alternative components.

Figure 3:
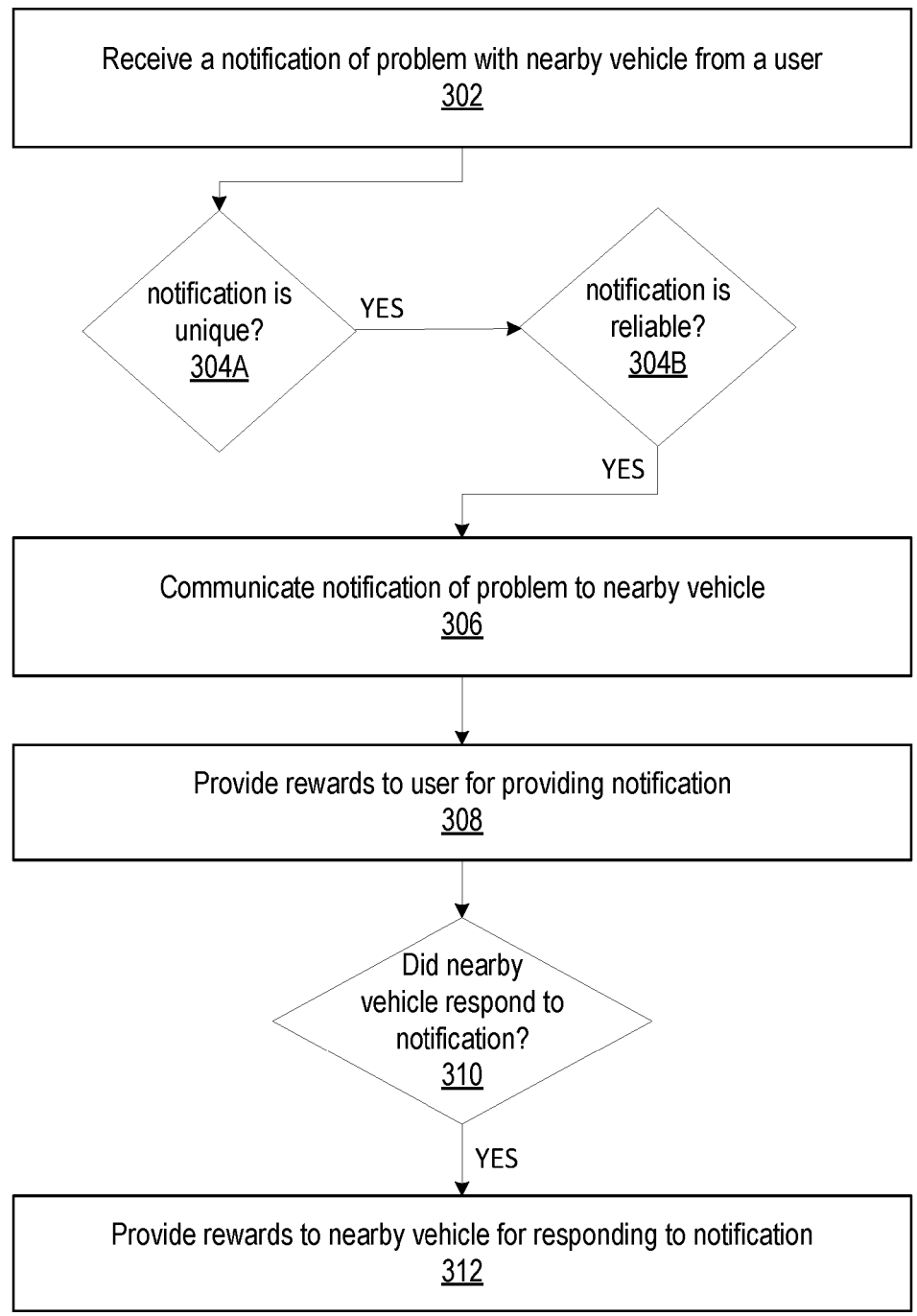
FIG. 3 is a flowchart of high-level example method steps of a roadside reporter system.

Referring now to FIG. 3, a flowchart 300 of high-level example steps of a roadside reporter server 104 is shown. The various components of the roadside reporter server 104 may be used to perform these method steps. The notification queue management module 202 may be configured to, in operation, receive a notification of an issue with a nearby vehicle (block 302). In one example, the notification may be submitted by a user of the system, and may be based on observations made directly by the user. Alternatively, the notification may be based on a user's observations made through an external source (e.g. camera, satellite, etc.). In yet another example, the notification may be submitted by a system (e.g., another vehicle, surveillance system, etc.), where the system automatically detects an issue with a nearby vehicle.

The notification queue management module 202 may maintain the incoming notifications in chronological order. In some examples, the notification queue management module 202 may receive notifications from several users reporting the same issue. Additionally, the notification queue management module 202 may store all received notifications in the notification information database 228, and may associate each notification with a user in the reporter information database 216, and a driver in the driver information database 214.

The notification evaluation module 204 may be configured to, in operation, determine the uniqueness (see 304A) and reliability (see 304B) of a notification. In some examples, the notification evaluation module 204 may flag a notification as duplicate or unreliable. The notification evaluation module 204 may update the notification information database 228 to reflect that a notification has been flagged as duplicate or unreliable. In such examples, the flagged notifications may be rejected, such that the rejected notifications are not communicated to drivers, insurance companies, and other agencies. The notification evaluation module 204 may determine uniqueness, in some examples, based on chronological order. For example, if the roadside reporter server 104 receives multiple notifications of the same issue with a nearby vehicle, the notification evaluation module 204 may process only the chronologically first notification, and flag the remaining notifications as duplicate. Specifically, responsive to receiving a new notification, the notification evaluation module 204 may query the notification information database 228 for other notifications reporting the same issue as the new notification. The notification evaluation module 204 may then determine whether there exists another notification, which is not flagged as duplicate or unreliable. Further, the notification evaluation module 204 may limit the query to only search for other notifications within a predetermined time period (e.g., preceding the new notification by five minutes or less, or some other predetermined amount of time less than or more than five minutes).

The notification evaluation module 204 may determine the reliability of the notification based on the relative locations of the reporting user and the driver of the reported vehicle. For example, the notification evaluation module 204 may flag notifications as unreliable where the reporting user's location (e.g., based on GPS data) is outside a predetermined radius of the reported vehicle's location (e.g., based on GPS data), since it would be unlikely that the reporting user is within observable distance of the reported vehicle. However, in another example, where the reporting user is monitoring the vehicle's activity through an external source (e.g., another vehicle, surveillance system, etc.), the notification evaluation module 204 may determine the reliability of the notification based on the relative locations of the external source and the reported vehicle. In such examples, the notification evaluation module 204 may flag notifications as reliable where the external source's location (e.g., based on GPS data) is within a predetermined radius of the reported vehicle's location (e.g., based on GPS data), notwithstanding that the reporting user's location (e.g., based on GPS data) may be outside the predetermined radius of the reported vehicle's location.

Additionally or alternatively, the notification evaluation module 204 may presume reliability of notifications from a reporting user. For example, notifications may be presumed to be reliable where the reporting user has earned more than a threshold number of rewards for prior unique and reliable notifications. In such examples, the notification evaluation module 204 may compare the number of rewards associated with the reporting user in the reporter rewards database 224 with a predetermined threshold. Alternatively, the notification evaluation module 204 may presume reliability if the reporting user has attained a particular rewards status or tier (e.g., Silver, Gold, Platinum, etc.), as indicated in the reporter information database 216.

In some examples, the notification evaluation module 204 may calculate a reliability score for a notification. The notification evaluation module 204 may compare the reliability score to a predetermined threshold for reliability. Where the predetermined threshold represents a maximum tolerable risk, the notification evaluation module 204 may flag a notification as unreliable where the reliability score meets or exceeds the predetermined threshold. Conversely, where the predetermined threshold represents a minimum level of reliability, the notification evaluation module 204 may flag a notification as unreliable unless the reliability score meets or exceeds the predetermined threshold.

Further, the notification evaluation module 204 may determine the level of severity (e.g. Low Risk, Medium Risk, High Risk, Critical Risk) of the notification. For example, the notification evaluation module 204 may assess the risk level associated with a reported issue. The assessment may be based on the type of notification (e.g., traffic violations, visible problems, etc.), and guidance provided by insurance companies and other agencies. The level of severity of the notification may be used by the roadside reporter server 104 as described in further detail below.

The notification communication module 206 may be configured to, in operation, notify a driver of a nearby vehicle, associated insurance companies, and other agencies, of the issue (block 306). In the example of a system where the driver of a vehicle (i.e., notified driver) with an issue is notified, a nearby vehicle driver (i.e., observing driver) may not know or have ready access to one or more of the phone number of the notified driver, username of the notified driver, or the address (e.g., IP address, mailing address, etc.) of the notified driver. As such, the aforementioned information identifying the notified driver is omitted from the notification when created by the observing driver. Rather, the observing driver submits, with the notification of the issue, one or more of descriptive vehicle information about the vehicle of the notified driver. Examples of such descriptive vehicle information include, but are not limited to, vehicle make, vehicle model, vehicle color, vehicle style (e.g., convertible, coupe, sedan, SUV, etc.), vehicle condition (e.g., rusted, dented, etc.), a full or partial vehicle license plate number, or other descriptive features of a vehicle.

Then, the notification communication module 206 may identify the driver of the reported vehicle (i.e., the notified driver) by matching the descriptive vehicle information in the notification with the vehicle information in the driver information database 214. In addition, when desirable, the current location of the observing driver's vehicle may be used to further assist in identifying and matching the descriptive vehicle information with the notified driver. For example, if the make and model information entered by the observing driver are common values and match with numerous vehicles in the driver information database 214, then the system (e.g., notification communication module 206) may attempt to determine the current location of some or all of these numerous matched vehicles. If the current location of one of these vehicles is within a predetermined radius of the observing driver's location, then the system may reduce the list of numerous matched vehicles to just one matched vehicle. In some examples, more than one matched vehicle may be identified within the predetermined radius, and as such, further descriptive vehicle information (e.g., vehicle color or other information) may be required before the observing driver's submission may be accepted. In some examples, the further descriptive vehicle information may come from a different observing driver (e.g., a first observing driver may provide a portion of the license plate and an indication of the issue, and a second observing driver may provide indication of the same issue, but with a different portion of the license plate; meanwhile, the notification communication module 206 may piece the information from the two observing drivers together to positively identify the notified driver's vehicle.)

Once a matching driver is found in the driver information database 214, the notification communication module 206 may decide whether to communicate the notification to the driver, associated insurance companies, and other agencies. Additionally, the notification communication module may associate each notification with a driver in the driver information database 214.

In some examples, the notification communication module 206 may notify a driver of a nearby vehicle of the issue no more than thirty seconds after receiving a notification of the issue at the notification queue management module 202. The delay of no more than thirty seconds may be due to latency in the roadside reporter system 102 (e.g., network latency, computer system latency, etc.). Thus, in some instances, the notification communication module 206 may notify a driver of a nearby vehicle of the issue in less (or significantly less) time than thirty seconds (e.g., within one second, within 29 seconds, or within a different number of seconds between zero to thirty). In other examples, due to external factors (e.g., network congestion, network outages, system outages, system failures, etc.), the notification communication module 206 may not be able to notify the driver of a nearby vehicle of the issue within thirty seconds after receiving the notification. However, in these examples, the notification communication module 206 may notify the driver at the earlier possible time given the circumstances, such as after thirty seconds, within 45 seconds, within a minute, or within a different number of minutes between one-half a minute to sixty minutes. Additionally or alternatively, where the notification communication module 206 is unsuccessful in notifying a driver of a nearby vehicle of an issue on the first attempt, the notification communication module 206 may attempt to resend the notification one or more times.

The notification communication module 206 may communicate with drivers, associated insurance companies, and/or other agencies, as indicated by the contact information and system preferences (e.g., notification preferences) stored in the driver information database 214 for drivers, in the insurance company information database 218 for insurance companies, and in the agency information database 220 for other agencies. The applicable system preferences may depend on the notification evaluation module's 204 assessment of the notification's level of severity. In some examples, the notification communication module 206 may communicate with drivers, associated insurance companies, and/or other agencies through a preferred method of receiving notifications as indicated by the system preferences. Further, the notification communication module 206 may communicate with drivers, associated insurance companies, and/or other agencies for certain types of notifications, as indicated by the system preferences. Additionally or alternatively, the notification communication module 206 may communicate with drivers, insurance companies, and/or other agencies at predetermined frequencies, instead of for each unique and reliable notification, as indicated by the system preferences.

The rewards issuance module 232 may be configured to, in operation, issue rewards to the user for submitting the notification (block 308). The rewards issuance module 232 may issue rewards to reporting users for each unique and reliable notification submitted. Thus, a reporting user may receive a reward for each submitted notification that is not flagged as duplicate or unreliable by the notification evaluation module 204. For example, the rewards issuance module 232 may issue rewards as points, where each reward constitutes one or more points. The number of reward points awarded for a notification may vary based on the notification's level of severity, as determined by the notification evaluation module 204. For example, the rewards issuance module 232 may issue ten points for a notification assessed to be Low Risk, twenty points for a notification assessed to be Medium Risk, thirty points for a notification assessed to be High Risk, and fifty points for a notification assessed to be Critical Risk.

The notification response module 208 may be configured to, in operation, allow the driver of the nearby vehicle to respond to the notification (block 310). For example, the notification response module 208 may allow the driver to acknowledge and address the violation or problem reported in the notification. Alternatively, the notification response module 208 may allow the driver to contest the violation or problem. Example implementations of the notification response module 208 will be descried in further detail below.

The rewards issuance module 232 may also be configured to, in operation, issue rewards to the driver of the nearby vehicle for responding to the notification (block 312). The rewards issuance module 232 may issue rewards to drivers for acknowledging and addressing reported violations or problems, in a similar fashion to issuing rewards to reporting users. Thus, a driver may receive a reward for each addressed or contested problem or violation processed by the notification response module 208. For example, the rewards issuance module 232 may issue rewards as points, where each reward constitutes one or more points. The user (e.g., driver) of the vehicle responding to the notification may receive, on the display of their computing device 101, information about the issue with their vehicle and/or driving and the corresponding amount of reward points they may obtain by timely addressing the issue. The system disclosed herein enables the ability to in near-realtime identify an issue with a vehicle in a collaborative manner, share that issue with the driver (or user) of the impaired vehicle, and reward the driver of the impaired vehicle for remedying the issue. As a result, the system enables the opportunity to implement a reward system for better driving behavior that was previously not possible without the system.

The number of reward points awarded for an addressed problem or violation may vary based on the problem or violation's level of severity, as determined by the notification evaluation module 204. For example, the rewards issuance module 232 may issue one hundred points for a problem or violation assessed to be Low Risk, two hundred points for a problem or violation assessed to be Medium Risk, three hundred points for a problem or violation assessed to be High Risk, and five hundred points for a problem or violation assessed to be Critical Risk. The number of reward points awarded to drivers for each level of severity may be less, equal, or more than the number of reward points awarded to reporting users for the same or comparable level of security.

In some example implementations, the rewards issuance module 232 may only issue rewards if the driver responds to the notification within a predetermined time period. For example, the rewards issuance module 232 may issue rewards only if the driver responds to the notification within five days of the notification being reported to the roadside reporter server 104. Alternatively, the predetermined time period may vary based on the criticality of the problem or violation. For example, the rewards issuance module 232 may only issue rewards for Critical Risk issues if the driver responds within 24 hours of the notification reported to the roadside reporter server 104, whereas, the rewards issuance module 232 may issue rewards for Low Risk issues if the driver responds within 30 days.

Figure 4:
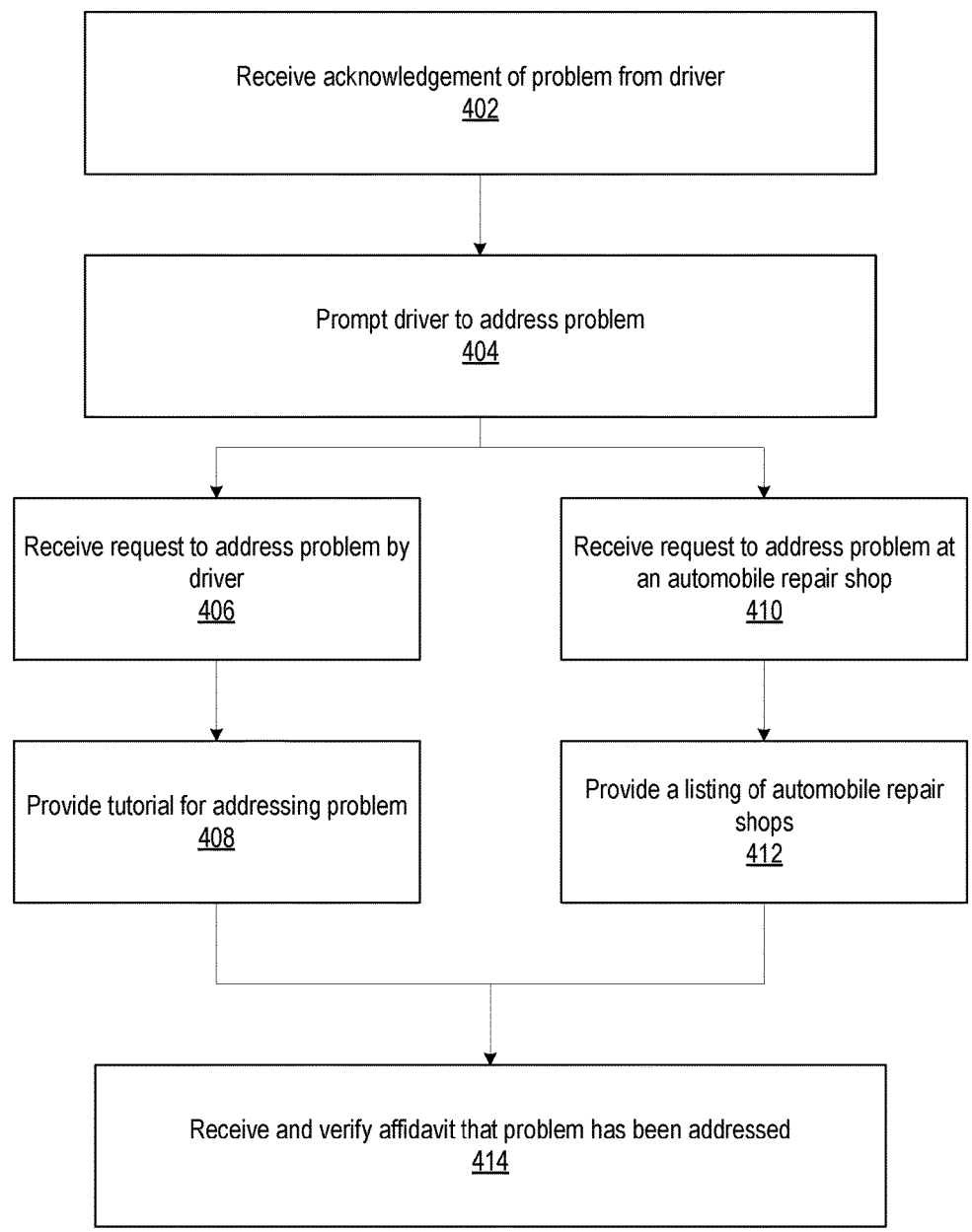
FIG. 4 is a flowchart of example method steps for acknowledging and addressing a problem reported by a notification.

Referring now to FIG. 4, a flowchart 400 of example steps for enabling a driver of a vehicle to acknowledge and address a problem reported by a notification. First, the notification response module 208 may receive an acknowledgement from the driver regarding the notification (block 402). This acknowledgement may serve to indicate that the driver has successfully received the notification from the roadside reporter server 104, and that the driver accepts that the problem is truly indicative of the current or past condition of the vehicle. In some examples, in response to the driver acknowledging the problem, the notification response module 208 may prompt the driver to address the problem (block 404). For example, the driver may choose to employ a "fix-it-yourself" approach, whereby the driver may attempt to fix the problem themselves without the aid of a third-party. Alternatively, the driver may choose to take the vehicle to an automobile repair shop. In some examples, the notification response module 208 may update the notification information database 228 to reflect that the notification has been acknowledged by the driver. Further, flagging a notification as acknowledged may cause the notification evaluation module 204 to flag subsequent notifications reporting the same issue as duplicates.

Accordingly, the notification response module 208 may receive a request from the driver to address the problem using the "fix-it-yourself" approach (block 406). In response to this request, the notification response module 208 may provide a tutorial to the driver (block 408). The tutorial may include instructions of how to safely and successfully address the reported problem, including method steps, tools needed, parts required, time required, and so forth. Based on the problem to be addressed, the notification response module 208 may retrieve all applicable tutorials from the educational information database 236. In some example implementations, the notification response module 208 may only retrieve some of the applicable tutorials from the educational information database 236. For example, the notification response module 208 may only retrieve one format of tutorials (e.g., text, audio, video, graphical, etc.)

Additionally or alternatively, the notification response module 208 may receive a request from the driver to address the problem at an automobile repair shop (block 410). In response to this request, the notification response module 208 may provide a list of automobile repair shops where the driver may take the vehicle to address the reported problem (block 412). The notification response module 208 retrieves all automobile repair shops from the repair shop information database 234. In some example implementations, the driver's request to address the problem at an automobile repair shop may include the driver's current location (e.g., based on GPS data). In such examples, the notification response module 208 may only retrieve some of the automobile repair shops from the repair shop information database 234. For example, the notification response module 208 may only retrieve automobile repair shops within a particular radius (e.g., 1 mile, 5 miles, etc.) of the driver's current location. Further, the notification response module 208 may sort the automobile repair shops by distance from the driver's current location. In other example implementations, the notification response module 208 may estimate the cost of addressing the problem at each of the automobile repair shops in the retrieved list. The estimation is based on the cost of services associated with an automobile repair shop, as indicated in the repair shop information database 234. For example, if the notification reported that the vehicle's tail light is broken, the notification response module 208 may retrieve the cost of repairing a tail light for an automobile repair shop in the repair shop information database 234. Additionally, the notification response module 208 may sort the automobile repair shops by cost of addressing the problem.

In some example implementations, the notification response module 208 may also obtain a list of automobile repair shops from a third-party remote system. This list may include automobile repair shops not included in the repair shop information database 234. In this example, the notification response module 208 may provide the third-party remote system with the driver's current location (e.g., based on GPS data). Information provided to the third-party remote system may be limited to the information necessary to determine nearby automobile repair shops based on the driver's current location. Further, the information provided to the third-party remote system will be anonymous to protect the privacy of the driver.

In response, the notification response module 208 may expect a list of automobile repair shops, and may include information associated with each automobile repair shops, e.g., name, location, services offered, cost of services offered, and so forth. Where supported by the third-party remote system, the notification response module 208 may retrieve some of the automobile repair shops, and may estimate the cost of addressing the problem where such information is available.

Following the repair, the driver may submit, to the notification response module 208, a confirmation that the problem has been addressed. In turn, the notification response module 208 may receive and verify the confirmation (block 414). The confirmation may include an image or video of the vehicle indicating that the problem has been addressed. In some example implementations, where the automobile repair shop is recognized by the roadside reporter server 104 (e.g., included in the repair shop information database 234), the confirmation may simply be a certification of the vehicle's current condition from the automobile repair shop. In other example implementations involving an automobile repair shop recognized by the roadside reporter server 104, the roadside reporter server 104 may provide an interface through which the automobile repair shop may directly submit a confirmation.

Where the confirmation includes an image or video, the notification response module 208 may compare an image or video of the reported problem, as included in the notification, with an image or video from the confirmation. The notification response module 208 may determine whether there is a significant difference between the two images or videos, and thereby verify the confirmation. In other examples, the driver interaction module 208 may send the confirmation including the image or video to the reporting user in expectation of a verification that the problem has been addressed satisfactorily.

Figure 5:
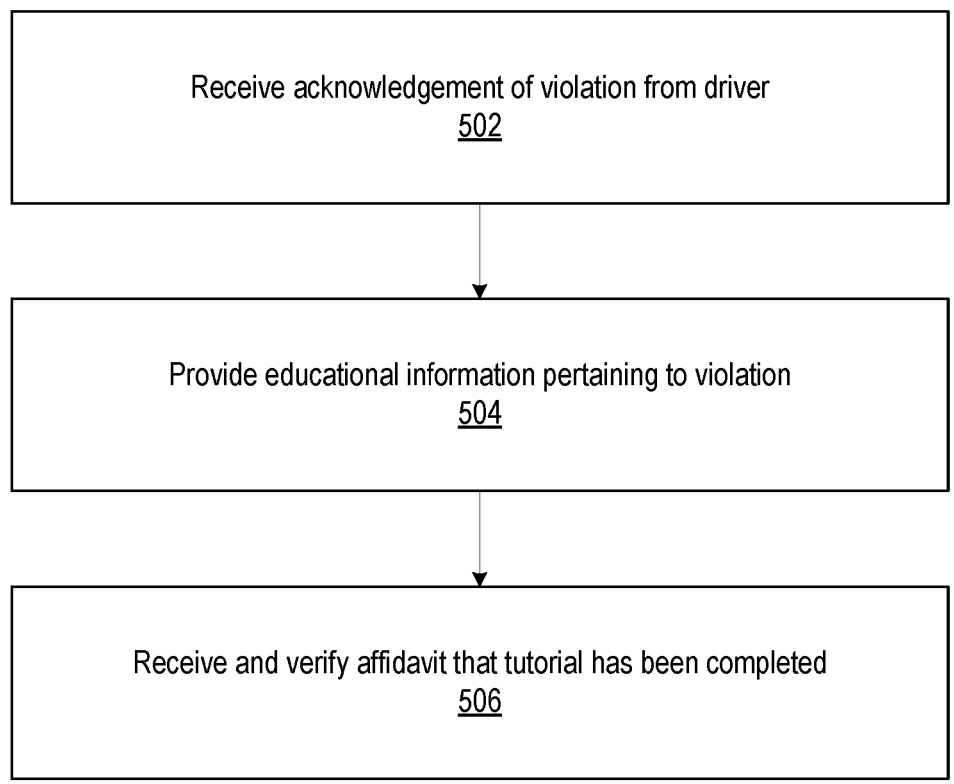
FIG. 5 is a flowchart of example method steps for acknowledging and addressing a violation reported by a notification.

Referring now to FIG. 5, a flowchart 500 of example steps for enabling a driver of a vehicle to acknowledge and address a violation reported by a notification. First, the notification response module 208 may receive an acknowledgement from the driver regarding the notification (block 502). This acknowledgement may serve to indicate that the driver has successfully received the notification from the roadside reporter server 104, and that the driver accepts that there was a violation. In response to the acknowledgement, the driver interaction module 208 may provide educational information to the driver (block 504). The educational information may include a tutorial on the violated rules, information about driver and public safety, and so forth. Based on the violation, the notification response module 208 may retrieve all applicable tutorials from the educational information database 236. However, in some example implementations, the notification response module 208 may only retrieve some of the applicable tutorials from the educational information database 236. For example, the notification response module 208 may only retrieve one format of tutorials (e.g., text, audio, video, graphical, etc.).

Additionally, the driver may submit, to the notification response module 208, a confirmation that the tutorial has been completed. In turn, the notification response module 208 may receive and verify the confirmation (block 506). In some example implementations, the tutorials may provide a completion certificate to the driver. In such examples, the driver may include the completion certification in the confirmation, and the notification response module 208 may verify the authenticity of the completion certificate.

Figure 6:
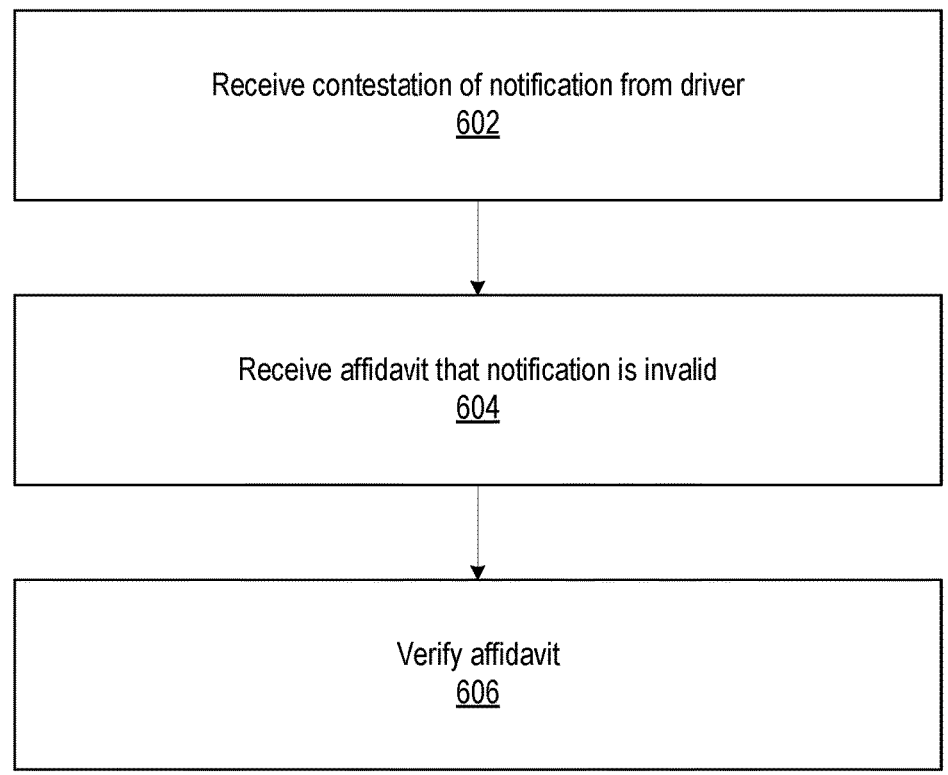
FIG. 6 is a flowchart of example method steps of for contesting a problem or violation reported by a notification.

Referring now to FIG. 6, a flowchart 600 of example steps for enabling a driver of a vehicle to contest a problem or violation reported by a notification. First, the notification response module 208 may receive a contestation from the driver regarding the notification (block 602). This contestation may serve to indicate that the driver has successfully received the notification from the roadside reporter server 104, but that the driver does not accept that there was a problem or violation. The driver may submit a confirmation in support of the contention that the notification submitted by the reporting user was invalid. Accordingly, the notification response module 208 may receive a confirmation from the driver (block 604). The confirmation of contestation may include an image, a video, telemetric data, or diagnostic data of the vehicle indicating that the problem or violation is invalid. The image or video may be obtained from the driver's personal sources or from public sources (e.g., law enforcement, other individuals, corporations, etc.). The telemetric and diagnostic data may be obtained from devices present in the driver's vehicle. Additionally or alternatively, the confirmation of contestation may include the location of the vehicle (e.g., based on GPS data) at the time the notification was submitted to the roadside reporter server 104.

The notification response module 208 may verify the confirmation based on the content included within the confirmation (block 606). Where the confirmation includes an image or video, the notification response module 208 may compare an image or video of an acceptable vehicle (e.g., a vehicle without visible problems, a vehicle not in violation, etc.) with an image or video from the confirmation. The notification response module 208 may determine whether there is minimal difference between the two images or videos, and thereby verify the confirmation.

Where the confirmation includes telemetric data or diagnostic data, the notification response module 208 may compare data of an acceptable vehicle (e.g., a vehicle without visible problems, a vehicle not in violation, etc.) with the data from the confirmation. The notification response module 208 may determine whether there is minimal difference between the two sets of data, and thereby verify the confirmation.

Where the confirmation includes location data, the notification response module 208 may compare the alleged location of the vehicle from the notification with the location of the vehicle from the confirmation. The notification response module 208 may determine whether location of the vehicle from the confirmation is outside a predetermined radius of the location of the vehicle from the notification, and thereby verify the confirmation.

With reference to FIG. 4 and FIG. 5, if the notification response module 208 verifies a confirmation regarding a problem, violation, or completed tutorial, it may recommend issuing a reward to the driver for responding to the notification and addressing the problem or violation, as indicated by block 312 of FIG. 3.

In order to maintain the accuracy of the roadside reporter server 104, the system 102 may need to be cognizant of fraudulent activity by reporting users. The roadside reporter server 104 may take certain steps to avoid future fraudulent activity by the same reporting user. For example, the roadside reporter server 104 may cancel rewards issued to fraudulent users. In other examples, the roadside reporter server 104 may flag users conducting fraudulent activity such that they are blocked from using the system. In an example implementation, where a notification response module 208 receives and verifies a confirmation of contestation from a driver following the receipt of a notification, the driver interaction module 208 may cancel any rewards issued to the reporting user in conjunction with the fraudulent notification. In doing so, the notification response module 208 may cancel any rewards associated with this notification from the reporter rewards database 224.

Additionally or alternatively, the notification response module 208 may flag the reporting user as fraudulent in the reporter information database 216. In some examples, a flagged user may not be able to submit any more notifications to the roadside reporter server 104. To block future notifications from the reporting user, the roadside reporter server 104 may determine whether the user submitting the notification is fraudulent or not before proceeding. Alternatively, in another example, the notification response module 208 may track the number of times a user has conducted fraudulent activity in the reporter information database 216. In this example, the roadside reporter server 104 may only block reporting users with a threshold number of occurrences of fraudulent activity.

Other examples of fraudulent activity may be detected by the notification evaluation module 204, such as when a user submits a notification referencing a problem or violation with their own vehicle. Similar to the other instances of fraud, the notification evaluation module 204 may update the number of occurrences of fraudulent activity associated with this user in the reporter information database 216. Additionally or alternatively, the notification evaluation module 204 may block the user from submitting any more notifications to the roadside reporter server 104. It will be appreciated by those skilled in the art that other circumstances may also result in a detection of fraudulent activity with regard to the roadside reporter server 104.

In an example implementation in accordance with aspects of this disclosure, an insurance company may allow reporting users and drivers to redeem earned rewards or reward points for discounted vehicle insurance premiums. Decreasing insurance premiums for reporting users may encourage more users to participate in the roadside reporter program, thus increasing public safety and awareness. Decreasing insurance premiums for drivers may encourage drivers to promptly address violations or problems with vehicles when they arise. Additionally, decreasing insurance premiums provides an incentive for an existing insurance customer to maintain an insurance policy with the insurance policy, or provides an incentive for prospective insurance customer to purchase a vehicle insurance policy from the insurance company at a lower rate. In one example, the amount of reward points earned may be used as a rating factor for underwriting an insurance policy for a driver and/or vehicle. As such, when a user applies for automobile insurance, data collected through the systems described herein may be used to underwrite the risk associated with insuring that person and/or vehicle. Data, such as the amount of time elapsed between notification of an issue and resolution of the issue, or the number of reward points earned in a time period, may be included as one or more rating factors in an insurance policy pricing model. The data may be collected and stored at a remote server and/or data store where an insurance pricing engine may access it and use it in calculating the premium for a requested insurance policy.

In another example implementation in accordance with aspects of this disclosure, other agencies (e.g. law enforcement, fleet owners, federal government, state government, etc.) may allow reporting users and drivers to redeem rewards or reward points for discounted taxes, traffic violation fees, public transportation systems, and so forth. Incentives may also include other non-monetary benefits, such as recognition or employment benefits.

Finally, in some examples, electronic hardware and/or software may be integrated into the in-vehicle dash display of a vehicle such that the traditional fault indicators (e.g., low tire pressure indicator, trunk open indicator, oil indicator, brake light out indicator) built into the dashboard of a vehicle may be replaced or supplemented with indicators with a collaborative source instead of the traditional, vehicle sensor source. The collaborative source may be provided by computing devices 101 in observing vehicles 120 in accordance with the systems and method described herein. As such, issues such as an item (e.g., coffee cup) left on the roof of a vehicle 110 may be observed and relayed to the impaired vehicle 120 in a timely manner and also addressed in a timely manner. As a result, the safety of all drivers on the road and pedestrians may be improved.

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure. For example, while some embodiments refer to receiving from, outputting to, or otherwise communicating with a vehicle 110, 120, the reference to a vehicle is meant to include, as appropriate, an electronic device (e.g., a smartphone) being operated from inside the vehicle 110, an electronic device (e.g., an OBD/OBDII device) coupled to the vehicle 110, or electronics (e.g., in-car dash display) integrated within the vehicle 110.

What is claimed is:

1. A method comprising:
   determining, by a location positioning component of a mobile user device at a first vehicle, a first location of the first vehicle;
   receiving, at the first vehicle via an antenna of the mobile user device at the first vehicle, a notification associated with an issue of the first vehicle, wherein the notification comprises a level of severity, wherein the notification originated from a device in a second vehicle at a second location within a predetermined distance of the first location;
   displaying, on a display monitor of the mobile user device at the first vehicle, the issue of the first vehicle provided in the received notification and a number of rewards for acknowledging the notification based on the level of severity;
   receiving, via an interface of the display monitor in the first vehicle, an acknowledgment of the notification within a predetermined duration of time;
   transmitting, via the antenna and to a server, the acknowledgement of the notification; and
   receiving, via the antenna, at least one reward for acknowledging the notification based on the level of severity.

2. The method of claim 1, wherein the notification, when at the second vehicle, includes descriptive vehicle information identifying the first vehicle without identifying a driver of the first vehicle, wherein the descriptive vehicle information comprises at least one of: a vicinity of the second vehicle, a vehicle make of the first vehicle, a vehicle model of the first vehicle, a vehicle color of the first vehicle, a vehicle style of the first vehicle, or a vehicle condition of the first vehicle, and wherein the issue is a problem associated with the first vehicle, the method further comprising:
   transmitting, via the antenna, a request to address the problem independently; and
   responsive to the request, receiving, via the antenna, at least one tutorial to assist in addressing the problem independently.

3. The method of claim 2, further comprising:
   transmitting, via the antenna, a confirmation that the problem has been addressed; and
   responsive to the confirmation, receiving, via the antenna, at least one reward for addressing the problem based on the level of severity.

4. The method of claim 1, wherein the issue is a problem associated with the first vehicle, the method further comprising:

transmitting, via the antenna, a request to address the
problem at an automobile repair shop; and
responsive to the request, receiving, via the antenna, a list
including at least one automobile repair shop.

5. The method of claim 4, wherein the request includes a current location of the first vehicle, and the list includes at least one automobile repair shop within a second predetermined distance of the current location of the first vehicle.

6. The method of claim 4, wherein the list further includes an estimated cost of addressing the problem at the at least one automobile repair shop.

7. The method of claim 4, further comprising:
transmitting, via the antenna, a confirmation that the problem has been addressed; and
responsive to the confirmation, receiving, via the antenna, at least one reward for addressing the problem based on the level of severity.

8. An apparatus comprising:
at least one processor; and
memory storing computer-readable instructions that, when executed by the at least one processor, cause the apparatus to:
receive, at a first time, a notification of an issue associated with a first vehicle, wherein the notification originates from a second vehicle within an observable distance of the first vehicle;
determine that the notification is unique;
responsive to determining that the notification is unique, output, at a second time, the notification to the first vehicle, wherein the second time is within a predetermined period of time after the first time, wherein the notification comprises a level of severity, and a number of rewards for acknowledging the notification based on the level of severity;
receive an acknowledgment of the issue within a predetermined duration of time to receive the number of rewards for acknowledging the notification, wherein the acknowledgment originates from inside the first vehicle; and
transmit at least one reward to the first vehicle for acknowledging the notification based on the level of severity.

9. The apparatus of claim 8, wherein the notification includes descriptive vehicle information identifying the first vehicle, and wherein the descriptive vehicle information comprises at least one of a vehicle make of the first vehicle, a vehicle model of the first vehicle, a vehicle color of the first vehicle, a vehicle style of the first vehicle, or a vehicle condition of the first vehicle, and wherein the instructions, when executed by the at least one processor, further cause the apparatus to:
determine reliability of the notification; and
transmit a reward to the second vehicle that provided the notification, based, at least in part, on determining that the notification is unique, the reliability of the notification, and the level of severity.

10. The apparatus of claim 8, wherein the issue is a mechanical problem associated with the first vehicle, and the instructions, when executed by the at least one processor, further cause the apparatus to:
receive a request, originating from the first vehicle, to address the mechanical problem independently; and
responsive to the request, provide the first vehicle with at least one tutorial to assist in independently addressing the mechanical problem.

11. The apparatus of claim 10, wherein the instructions, when executed by the at least one processor, further cause the apparatus to:
receive a verified confirmation that the mechanical problem has been addressed; and
responsive to the verified confirmation, provide at least one reward to the first vehicle for addressing the mechanical problem based on the level of severity.

12. The apparatus of claim 8, wherein the issue is a problem associated with the first vehicle, and the instructions, when executed by the at least one processor, further cause the apparatus to:
receive a request, originating from the first vehicle, to address the problem at an automobile repair shop; and
responsive to the request to address the problem at an automobile shop, provide the first vehicle with a list including at least one automobile repair shop.

13. The apparatus of claim 12, wherein the request to address the problem at an automobile shop includes a location of the first vehicle, and the list includes at least one automobile repair shop within a predetermined distance of the location of the first vehicle.

14. The apparatus of claim 12, wherein the list further includes an estimated cost of addressing the problem at the at least one automobile repair shop.

15. The apparatus of claim 12, wherein the instructions, when executed by the at least one processor, further cause the apparatus to:
receive a verified confirmation that the problem has been addressed; and
responsive to the verified confirmation, provide at least one reward to the first vehicle for addressing the problem based on the level of severity.

16. The apparatus of claim 8, wherein the issue is a violation associated with the first vehicle, and the instructions, when executed by the at least one processor, further cause the apparatus to:
provide the first vehicle with at least one tutorial to educate the first vehicle about the violation and public safety;
receive a verified confirmation that the at least one tutorial has been completed; and
responsive to the verified confirmation, provide at least one reward to the first vehicle for addressing the violation based on the level of severity.

17. The apparatus of claim 8, wherein the instructions, when executed by the at least one processor, further cause the apparatus to:
receive a contestation of the notification, wherein the contestation includes a confirmation that the notification is invalid; and
responsive to the confirmation, provide at least one reward to the first vehicle for contesting the notification based on the level of severity.

18. A method of processing a roadside notification, the method comprising:
receiving a notification of an issue associated with a first vehicle, wherein the notification originated from a second vehicle within an observable distance of the first vehicle, and wherein the notification comprises:
a level of severity,
a number of rewards for acknowledging the notification based on the level of severity, and
a predetermined time period within which to acknowledge the notification;
determining a reliability of the notification;

responsive to determining that the notification is at least reliable, outputting the notification to the first vehicle;

receiving an acknowledgement of the issue within the predetermined time period, wherein the acknowledgement originates from an apparatus associated with the first vehicle; and transmitting, to the apparatus associated with the first vehicle, the number of rewards for acknowledging the notification.

19. The method of claim 18, further comprising:

receiving a request, originating from the apparatus associated with the first vehicle, to address the issue independently, wherein the issue is a problem associated with the first vehicle; and responsive to the request, providing the apparatus associated with the first vehicle with at least one tutorial to assist in addressing the problem independently;

receiving and verifying a confirmation that the problem has been addressed; and responsive to the confirmation, providing at least one second reward to the apparatus associated with the first vehicle for addressing the problem based on the level of severity.

20. The method of claim 18, further comprising:

receiving a request, originating from the apparatus associated with the first vehicle, to address the issue at an automobile repair shop, wherein the issue is a problem associated with the first vehicle;

responsive to the request, providing the apparatus associated with the first vehicle with a list including at least one automobile repair shop;

receiving a confirmation that the problem has been addressed; and responsive to the confirmation, providing at least one reward to the apparatus associated with first vehicle for addressing the problem based on a level of severity of the notification.

* * * * *